US012566620B1

(12) United States Patent
Kulesza et al.

(10) Patent No.: US 12,566,620 B1
(45) Date of Patent: Mar. 3, 2026

(54) DOCUMENT OBJECT MODEL NAVIGATOR AGENTIC SYSTEM

(71) Applicant: Intuit Inc., Mountain View, CA (US)

(72) Inventors: Steven Kulesza, San Diego, CA (US); Chase Roossin, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/215,313

(22) Filed: May 21, 2025

(51) Int. Cl.
| | |
|---|---|
| *G06F 40/30* | (2020.01) |
| *G06F 9/451* | (2018.01) |
| *H04L 65/403* | (2022.01) |

(52) U.S. Cl.
CPC .............. *G06F 9/451* (2018.02); *G06F 40/30* (2020.01); *H04L 65/403* (2013.01)

(58) Field of Classification Search
None
See application file for complete search history.

(56) References Cited

U.S. PATENT DOCUMENTS

| | | | | |
|---|---|---|---|---|
| 12,010,076 | B1 * | 6/2024 | Andrew .................. | H04L 51/02 |
| 2006/0117316 | A1 * | 6/2006 | Cismas ..................... | G06F 9/52 |
| | | | | 718/103 |
| 2024/0386216 | A1 * | 11/2024 | Sodhi ...................... | G06F 40/40 |
| 2024/0412720 | A1 * | 12/2024 | Vasylyev .......... | G06F 16/90332 |
| 2025/0021769 | A1 * | 1/2025 | Buckley ................... | G06F 8/30 |
| 2025/0104712 | A1 * | 3/2025 | Lyu .......................... | G06F 40/30 |
| 2025/0181882 | A1 * | 6/2025 | Bose .................... | G06F 9/5055 |

OTHER PUBLICATIONS

Tiwary, Nalin, Vardhan Dongre, Sanil Arun Chawla, Ashwin Lamani, and Dilek Hakkani-Tür. "From context to action: Analysis of the impact of state representation and context on the generalization of multi-turn web navigation agents." arXiv preprint arXiv: 2410. 23555 (2024). (Year: 2024).*
Zhang, Chaoyun, Shilin He, Jiaxu Qian, Bowen Li, Liqun Li, Si Qin, Yu Kang et al. "Large language model-brained gui agents: A survey." arXiv preprint arXiv:2411.18279 (2024). (Year: 2024).*
Cho, Junhee, Jihoon Kim, Daseul Bae, Jinho Choo, Youngjune Gwon, and Yeong-Dae Kwon. "Caap: Context-aware action planning prompting to solve computer tasks with front-end ui only." arXiv preprint arXiv:2406.06947 (2024). (Year: 2024).*

* cited by examiner

*Primary Examiner* — Frank D Mills
(74) *Attorney, Agent, or Firm* — Lathrop GPM LLP

(57) ABSTRACT

A method includes initiating a collaborative session with a user application. In the collaborative session, a user request, a document object model (DOM) of an active browser page of the user application, and a screen-capture of the active browser page are retrieved, and a sequence of actions is iteratively performed. A context window of a large language model (LLM) with is populated with the user request, the DOM, the screen-capture, a first action of the sequence of actions, and a corresponding action tool. The LLM configures the corresponding action tool using the context window. The active browser page is updated using the configured corresponding action tool. An updated DOM and an updated screen-capture corresponding to the updated active browser page are obtained to continue the iterations.

20 Claims, 8 Drawing Sheets

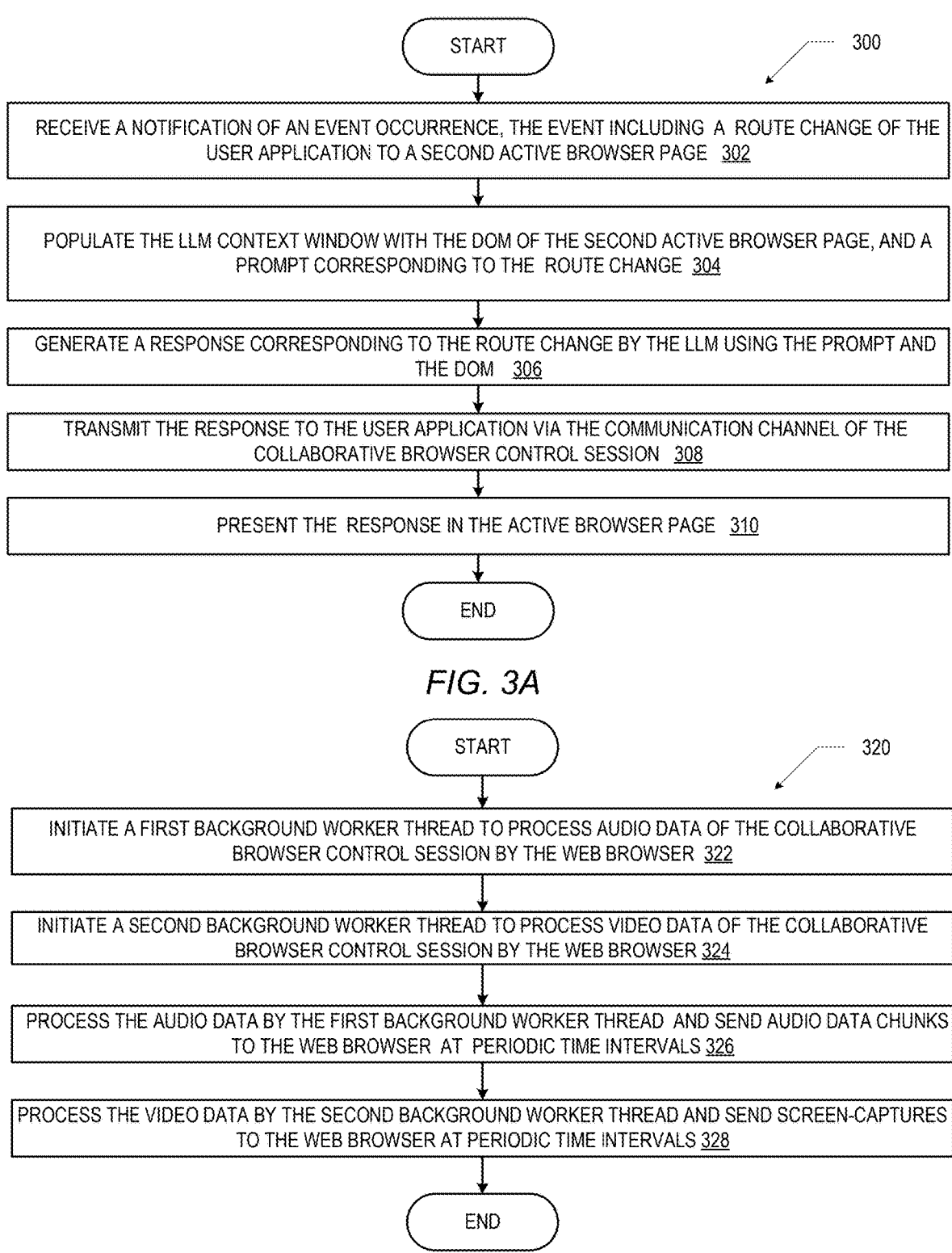

START

300

RECEIVE A NOTIFICATION OF AN EVENT OCCURRENCE, THE EVENT INCLUDING A ROUTE CHANGE OF THE USER APPLICATION TO A SECOND ACTIVE BROWSER PAGE  302

POPULATE THE LLM CONTEXT WINDOW WITH THE DOM OF THE SECOND ACTIVE BROWSER PAGE, AND A PROMPT CORRESPONDING TO THE ROUTE CHANGE  304

GENERATE A RESPONSE CORRESPONDING TO THE ROUTE CHANGE BY THE LLM USING THE PROMPT AND THE DOM  306

TRANSMIT THE RESPONSE TO THE USER APPLICATION VIA THE COMMUNICATION CHANNEL OF THE COLLABORATIVE BROWSER CONTROL SESSION  308

PRESENT THE RESPONSE IN THE ACTIVE BROWSER PAGE  310

END

*FIG. 3A*

START

320

INITIATE A FIRST BACKGROUND WORKER THREAD TO PROCESS AUDIO DATA OF THE COLLABORATIVE BROWSER CONTROL SESSION BY THE WEB BROWSER  322

INITIATE A SECOND BACKGROUND WORKER THREAD TO PROCESS VIDEO DATA OF THE COLLABORATIVE BROWSER CONTROL SESSION BY THE WEB BROWSER  324

PROCESS THE AUDIO DATA BY THE FIRST BACKGROUND WORKER THREAD AND SEND AUDIO DATA CHUNKS TO THE WEB BROWSER AT PERIODIC TIME INTERVALS  326

PROCESS THE VIDEO DATA BY THE SECOND BACKGROUND WORKER THREAD AND SEND SCREEN-CAPTURES TO THE WEB BROWSER AT PERIODIC TIME INTERVALS  328

END

```
INVOICE_PROMPT = '
actions:
 - type: "Talk about Invoicing"
talking_points_key: "sales_pitch_talking_points"
 - type: "Fill in Invoice"
description: "Guide user through filling out an invoice form."
action_context:
  - Each field in the invoice is incremented by row number.
  - Description: <textarea aria-label="Description line 1">
  - QTY: <input aria-label="Quantity line 1">
  - Rate: <input aria-label="Rate line 1">
  - Amount: <input aria-label="Amount line 1">
  - use QTY * Rate to fill in the Amount.
  - Once starting the action_steps. Fill in the entire row without asking with sample data based on the business name.
action_steps:
  - Important: Always click the Description in the row then fill in the value.
    - Proceed for the QTY, Rate, Amount fields.
description: "Automatically fill out the invoice form."
rows with sample data based on the company's name
 - type: "Navigate to page"
options_ref: "general_actions.navigate_to_page.options"
talking_points:
 sales_pitch_talking_points: |
Invoicing helps you get paid faster (2x average).
Create professional invoices, track status, offer convenient payment.
What payment methods do you use now? What are your invoicing challenges?
This application integrates with other tools. Want to see how it works?
```

504

Generated response to type "Talk about invoicing"
Invoicing helps you get paid faster. You can create professional invoices, track status and offer convenient payment methods. I can look at the payment methods you currently use and set up a payment method. I can help you with your invoicing challenges. What are your invoicing challenges?

506

Generated response to type "Fill in invoice"
I can guide you to add line items to an invoice. Each line item includes a description, a quantity, the price and the amount billed. Do you want to see a sample?

612
OUTPUT DEVICE(S)

604
NON-PERSISTENT
STORAGE

602
COMPUTER
PROCESSOR(S)

606
PERSISTENT
STORAGE

608
COMMUNICATION
INTERFACE

610
INPUT DEVICE(S)

620
NETWORK

622
NODE X

624
NODE Y

626
CLIENT DEVICE

DOCUMENT OBJECT MODEL NAVIGATOR AGENTIC SYSTEM

BACKGROUND

Software applications may have features that assist new users to quickly learn and use features and design workflows that best align with users' desired outcomes. Features that assist users on how best to use and work with a retail software may include computer use agents, such as chatbots, virtual assistants, and automated data entry tools. Additionally, computer use agents may automate frequently used workflows, set up reminders, perform searches and manage schedules. Computer use agents may engage in screen-sharing sessions for providing remote assistance, trouble-shooting and collaborative work.

Screen-sharing sessions may require additional installation on client or user computing systems, of web browser plugins, or user application extensions. Screen sharing has a technical problem of performance degradation due to lack of high-bandwidth internet connectivity. Further, synchronizing audio/video data in low-bandwidth conditions is another challenge with screen sharing. Screen-sharing across diverse server and client side systems may have challenges due to compatibility issues with diverse operating systems, and software version differences between server and client side systems leading to further performance degradation. Additionally, screen-sharing may inadvertently expose sensitive information due to user error or insufficient built-in security.

SUMMARY

In general, in one aspect, one or more embodiments relate to a method. The method includes initiating a collaborative session with a user application. The method further includes performing, in the collaborative session, operations including retrieving a user request, a document object model (DOM) of an active browser page of the user application, and a screen-capture of the active browser page and iteratively performing a sequence of actions. Performing the sequence of actions further includes populating a context window of a large language model (LLM) with the user request, the DOM, the screen-capture, a first action of the sequence of actions, and a corresponding action tool. Performing the sequence of actions further includes configuring, by the LLM, the corresponding action tool using the context window to obtain a configured corresponding action tool. Performing the sequence of actions further includes updating the active browser page using the configured corresponding action tool to obtain an updated active browser page. An updated DOM corresponding to the updated active browser page is obtained as the DOM, and an updated screen-capture corresponding to the updated active browser page as the screen-capture.

In general, in one aspect, one or more embodiments relate to a system. The system includes at least one computer processor, and a DOM orchestrator agent, executing on the at least one computer processor. The system further includes a multi-modal large language model (LLM), executing on the at least one computer processor. The system further includes an enterprise application service, executing on the at least one computer processor. The system further includes a real-time communication protocol server, executing on the at least one computer processor. The system is configured for initiating a collaborative session with a user application. The system is further configured for performing, in the collaborative session, operations including retrieving, by the DOM orchestrator agent, a user request, a document object model (DOM) of an active browser page of the user application, and a screen-capture of the active browser page. The system is further configured for iteratively performing a sequence of actions. Performing the sequence of actions includes populating a context window of the LLM with the user request, the DOM, the screen-capture, a first action of the sequence of actions, and a corresponding action tool. Performing the sequence of actions further includes configuring, by the LLM, the corresponding action tool using the context window to obtain a configured corresponding action tool. Performing the sequence of actions further includes updating the active browser page using the configured corresponding action tool to obtain an updated active browser page. An updated DOM corresponding to the updated active browser page as the DOM, and an updated screen-capture corresponding to the updated active browser page as the screen-capture are obtained by the DOM orchestrator agent.

In general, in one aspect, one or more embodiments relate to a method. The method includes obtaining, by a DOM orchestrator agent, permission to access an active browser page of a user application executing in a web browser. The method further includes initiating a collaborative session by opening, by the web browser, a communication channel to the DOM orchestrator agent. The communication channel is a real-time, bi-directional, synchronous communication channel. The method further includes performing, in the collaborative session, and for a duration of the collaborative session, operations including retrieving, by the DOM orchestrator agent, a user request, a document object model (DOM) of an active browser page of the user application, and a screen-capture of the active browser page. The operations further include generating, by an LLM, a sequence of actions, using the user request, the DOM, and the screen-capture. The operations further include iteratively performing the sequence of actions. Performing the sequence of actions includes populating, by the DOM orchestrator agent, a context window of an LLM with the user request, the DOM, the screen-capture, a first action of the sequence of actions, and a corresponding action tool. Performing the sequence of actions further includes configuring, by the LLM, the corresponding action tool using the context window to obtain a configured corresponding action tool. Performing the sequence of actions further includes updating, by the web browser, the active browser page using the configured corresponding action tool to obtain an updated active browser page. Performing the sequence of actions further includes obtaining, by the DOM orchestrator agent, an updated DOM corresponding to the updated active browser page as the DOM, and an updated screen-capture corresponding to the updated active browser page as the screen-capture.

Other aspects of one or more embodiments will be apparent from the following description and the appended claims.

BRIEF DESCRIPTION OF DRAWINGS

FIG. 3A shows a flowchart of a method, in accordance with one or more embodiments.

FIG. 3B shows a flowchart of a method, in accordance with one or more embodiments.

FIG. 5 shows an example of a pre-defined prompt, in accordance with one or more embodiments.

Like elements in the various figures are denoted by like reference numerals for consistency.

DETAILED DESCRIPTION

Figure 1:
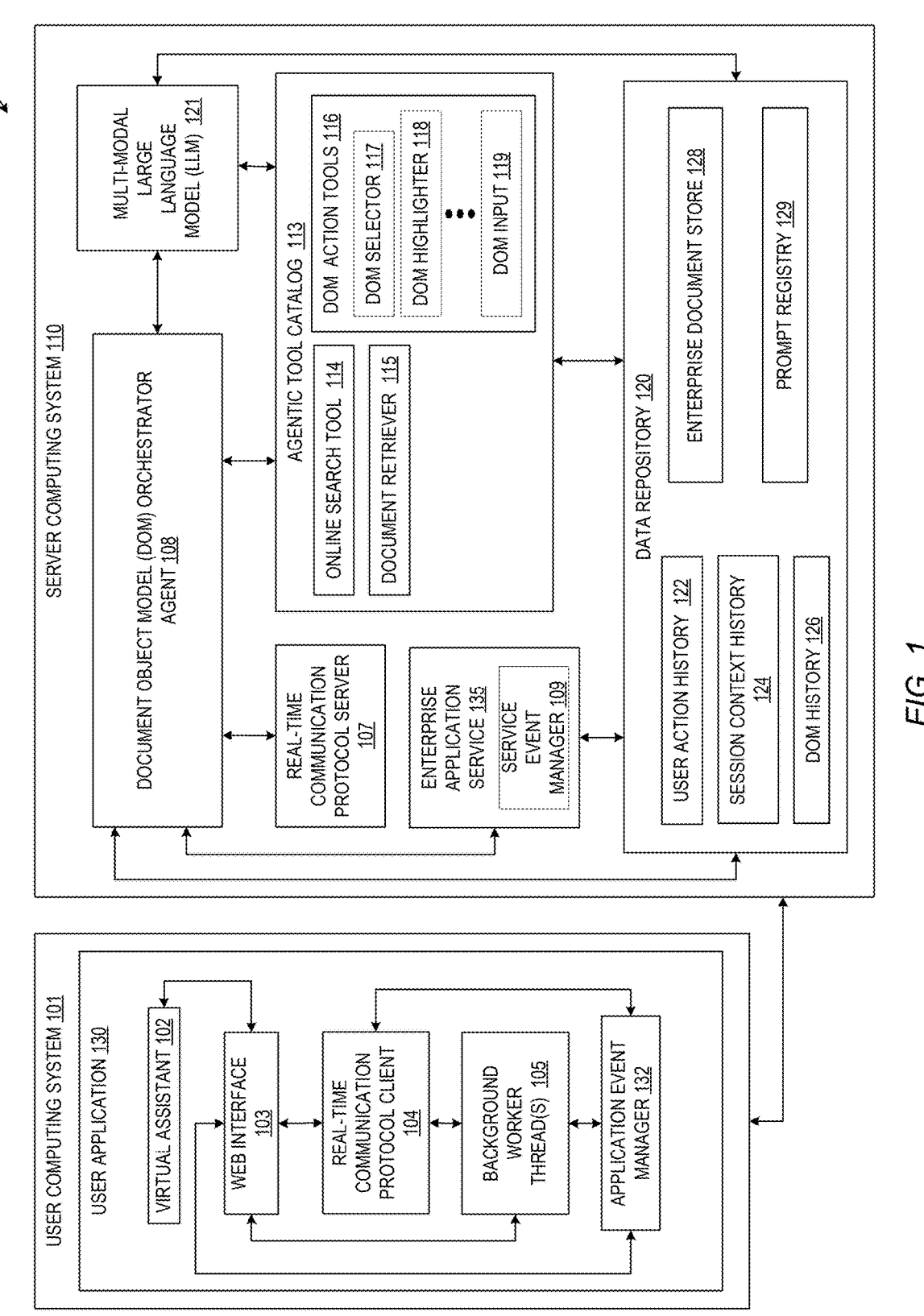
FIG. 1 shows a computing system, in accordance with one or more embodiments.

One or more embodiments are directed to a collaborative session established between a user application executing in a web browser and an artificial intelligence (AI) agent. A user may grant permission for the collaborative session. In the collaborative session, the AI agent uses the document object model of the web browser to interact with a user of the user application. The document object model (DOM) is a programmatic model of a web document. A web document is any document that can be accessed and displayed by a web browser. HyperText Markup Language (HTML) and extensible Markup Language (XML) documents are examples of web documents. Web documents are rendered by web browsers as web pages. A currently active web page is an active browser page.

When the collaborative session is initiated, a dedicated real-time, bi-directional, synchronous communication channel is established between the AI agent and the web browser. Through this communication channel, the AI agent may directly update the active browser page of the user application in real-time by manipulating the DOM of the active browser page. By sharing and capturing only the necessary elements of the DOM rather than the entire screen, the amount of data transmitted over the real-time communication channel is reduced. By using the DOM of the active browser page, the AI agent may affect incremental updates to the active browser page. Thus, the user perceives a "live" update of the active browser page. The web browser further initiates background worker threads for processing audio and video (A/V) data, which provide buffered audio data and screen-captures to the main web browser thread at periodic time intervals. The buffered audio and screen-captures are captured by the AI agent in addition to the DOM and processed in conjunction to generate and transmit responses.

In the collaborative session, the AI agent may transmit configured DOM manipulation scripts, referred to as DOM action tools. The AI agent may further transmit responses generated by a multi-modal large language model (LLM) to user requests. The configured DOM action tools and responses may be rendered by the web browser in the active browser page. The DOM action tools may be configured in accordance with a user request in conjunction with the session context and/or application context. The AI agent may use the multi-modal LLM to interpret the user request, session, and/or application context and generate a sequence of DOM actions or back-end actions, such as online search, data retrieval, etc. The execution loop of user requests, and actions and updates by the AI agent may continue for the duration of the collaborative session.

As a general overview, the DOM represents a web document as a logical tree of objects. In the logical tree of objects, each node may correspond to an element, attribute, or piece of text in the document. A DOM may be accessed programmatically using DOM programming interface function calls. Computer program code and scripts may dynamically access and update the content, structure, and style of webpages via the DOM and DOM application programming interface (API). Besides HTML and XML and Javascript, web documents may include Javascript® Object Notation (JSON) for data exchange, and other graphics formatting code. The DOM provides a standardized way to interact with web elements across diverse browsers.

Attention is now turned to the figures. FIG. 1 shows a computing system, in accordance with one or more embodiments. The system shown in FIG. 1 may include a server computing system (110). The server computing system (110) is one or more computer processors, data repositories, communication devices, and supporting hardware and software. The server computing system (110) may be in a distributed computing environment. The server computing system (110) includes a computer processor. The computer processor is one or more hardware or virtual processors which may execute computer readable program code that defines one or more applications, such as the document object model (DOM) orchestrator agent (108), the agentic tool catalog (113), the multi-modal large language model (LLM) (121), the real-time communication protocol server (106), or the enterprise application service (135). An example of the computer processor is described with respect to the computer processor(s) (602) of FIG. 6A. Thus, the server computing system (110) is configured to execute one or more applications, such as the DOM orchestrator agent (108), the agentic tool catalog (113), the LLM (121), the real-time communication protocol server (106), or the enterprise application service (135). An example of a computer system and network that may form the server computing system (110) is described with respect to FIG. 6A and FIG. 6B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) further includes an enterprise document store (128). The enterprise document store (128) stores documents related to diverse domains of enterprise applications hosted by the server computing system (110). The enterprise applications may act as server counterparts or services to diverse user application(s) (130), connecting to and interacting with the server computing system (110). For example, the user application (130) may be a small business finance and accounting application at a customer site. The small business finance and accounting application may be configured to interact with an enterprise application service (135) hosted on the server computing system (110). The enterprise application service (135) may use the enterprise document store (128) for data retrieval in servicing requests from the user application (130). The data may include user application data, such as customer information, invoice data, expense data, etc. Examples of enterprise document stores (128) include diverse relational databases, NoSQL databases, OpenText, M-Files, Guru, etc.

The data repository (120) further includes a prompt registry (129). The prompt registry (129) is a collection of pre-defined prompts to an LLM. The pre-defined prompts may be prompt templates. Prompt templates are structured formats of prompts in a machine-readable format, and processable by the LLM. An example of a prompt template is shown in FIG. 5. The LLM may process the prompt to generate a response. In one or more embodiments, the response may be an explanation of a feature of the user application (130). In other embodiments, the prompt may be a pre-defined workflow of actions, for example, filling out line items in an invoice.

The data repository (120) further includes a user action history (122), a session context history (124), and a DOM history (126), collectively referred to as application context in the current specification. Maintaining the application context in the data repository (120) facilitates the DOM orchestrator agent in initiating subsequent sessions from a point that aligns with the completed actions. Thus, a returning user to the application may resume interaction from when the interaction was previously terminated, with previous actions and context preserved.

The user action history (122) may include a record of all the actions performed by a user of the user application (130). The user action history may include clicks, form submissions, navigation events, and other actions. The user action history (122) provides the DOM orchestrator agent (108) the information to maintain continuity and personalized experience for the user.

The session context history (124) may include a record of the state of the application during the user session. For example, the session context history (124) may include a record of pages visited, data entered, overall session flow, etc. The session context history (124) may be used by the DOM orchestrator agent (108) to recreate the user's session context when the user resumes interaction of the user application (130).

The DOM history (126) includes a record of the changes made to the DOM during user interactions. The DOM history (126) may include snapshots of the DOM at periodic intervals, capturing the state of the webpage before and after a user action. The DOM orchestrator agent (108) may use the DOM history (126) to track changes to the webpage, ensuring accurate updating of the DOM in synchronization with the user actions.

The server computing system (110) further includes a DOM orchestrator agent (108). The DOM orchestrator agent (108) is software or application specific hardware which, when executed by the computer processor, remotely controls and coordinates manipulation of the document object model of the web interface (103) of the user application (130) and uses the LLM (121) to generate responses to user actions occurring in the web interface (103). In one or more embodiments, the DOM orchestrator agent (108) is an AI agent that uses the LLM (121) as a central computational engine. AI agents of LLMs comprehend and interpret natural language inputs, including text and speech. AI agents of LLMs may perform specific tasks, such as querying databases, retrieving information, and interacting with other software systems. AI agents of LLMs may use language capabilities to communicate and execute commands. Thus, the DOM orchestrator agent (108) works in conjunction with the user application (130), and the LLM (121). In one or more embodiments, the DOM orchestrator agent (108) may essentially perform the method of FIG. 2.

The server computing system (110) further includes a multi-modal large language model (LLM) (121). As used in the current specification, the terms "LLM (121)" and "LLM" refer to the multi-modal LLM (121) shown in the system of FIG. 1. Multi-modal LLMs are advanced machine learning models, trained on billions of parameters designed to process and generate content across multiple types of data, such as text, images, audio, and video. Multi-modal LLMs integrate various data modalities to perform more complex tasks and provide richer, more context-aware responses compared to LLMs processing natural language in text. For example, a multi-modal LLM may analyze images and generate descriptive text, interpret audio data, and provide transcriptions or summaries, and combine text and visual data to answer questions or create content. Multi-modal LLMs are trained to leverage the strengths of different data types for enhanced understanding and output capabilities. The context window of a multi-modal LLM refers to the span of data that the model can consider at one time, encompassing multiple types of inputs, such as text, images, audio, and video. Multi-modal LLMs may process and integrate information from various modalities simultaneously, enhancing the comprehensiveness and context-awareness of responses.

The server computing system (110) further includes an agentic tool catalog (113). The agentic tool catalog (113) works in conjunction with the DOM orchestrator agent (108) to provide one or more agentic tools to the DOM orchestrator agent (108) and/or the LLM. The agentic tool catalog (113) includes a catalog of tools. A tool of the agentic tool catalog (113) is computer program code and instructions, which when executed by the computer processor, performs a specific task related to processing user actions and requests for response generation. The specific tasks may include online search for retrieval augmented generation (RAG) of responses by the LLM, performed by the online search tool (114). The specific tasks may further include document retrieval from the enterprise document store, for use by the LLM (121) or the enterprise application service (135), performed by the document retriever (115). Tools, such as the online search tool (114) and the document retriever (115) that may not directly pertain to or manipulate the DOM may be referred to as action tools. However, these tools may be triggered by the DOM orchestrator agent (108) to obtain information to be rendered in the active browser page.

The specific tasks may further include a multitude of user interface actions, some of which may mimic an actual user performing the actions when interacting with the user application (130). The multitude of user interface actions may be performed by a corresponding multitude of DOM action tools. The DOM action tools as shown in FIG. 1, are grouped as the DOM action tools (116). The DOM action tools (116) may further include a DOM selector (117), for selecting a widget in the web interface (103). The DOM action tools (116) may further include a DOM highlighter (118) for highlighting a widget in the web interface (103) in a different color or style. The DOM action tools (116) further include a DOM input (119) for filling a form or widget with a value(s). Other DOM tools may be included for waypoint navigation, and other user interface actions. As used in the current specification, the DOM input (119), DOM highlighter (118), and DOM selector (117), and other tools that directly manipulate the DOM of the user application (130) may collectively or in the singular be referred to as "DOM action tool(s)" or "DOM tool(s)" in reference to the method of FIG. 2.

The DOM action tools are computer program codes for manipulating various entities and attributes of the document object model of the web interface (103). In one or more embodiments, the computer program code may be Javascript® code. Other programming languages processable by a web browser in rendering a browser page may be used. In a similar manner to prompt templates, the DOM action tools (116) may include parameterized code to manipulate the document object model. The parameters of a DOM action tool may constitute an input schema of the DOM action tool, including one or more entities and corresponding attributes. The input schema of the DOM action tool may be configured and/or populated with entity attribute values by the DOM orchestrator agent (108), working in conjunction with the LLM (121). Further, the configured DOM tool may be transmitted by the DOM orchestrator agent (108) to the user application (130), for executing and rendering of an updated webpage in the web interface (103).

By way of example, the DOM orchestrator agent (108) may receive a user direction via the virtual assistant (102) of the user application (130) to populate an invoice for a customer. The DOM orchestrator agent (108) may select the DOM input (119) tool from the agentic tool catalog (113). The DOM orchestrator agent (108) may programmatically populate a context window of the LLM (121) with the DOM input (119) tool. The LLM (121) may accordingly obtain or generate the parameter values for the invoice and configure the DOM input (119) tool with the parameter values. The DOM orchestrator agent (108) may then transmit the configured DOM input (119) tool to the user application (130), to be rendered in the web interface (103).

The server computing system (110) further includes a real-time communication protocol server (107). The real-time communication protocol server (107) is software or application-specific hardware, which, when executing on the computer processor, is configured to operate a real-time, synchronous communication channel with the user application (130). In one or more embodiments, the DOM orchestrator agent (108) may use the communication channel operated by the real-time communication protocol server (107) to directly update the web interface (103) of the user application (130). The communication channel may be used to transmit web documents including Javascript® code of one or more DOM tools to the user interface. Further, in one or more embodiments, the real-time communication protocol server (107) may be a server-side counterpart to the real-time communication protocol client (104) of the user application (130). One example of a real-time communication protocol is WebSocket. WebSocket is a protocol that enables real-time communication between clients and servers. The WebSocket protocol implements bi-directional, full-duplex communication between a client and server. Other examples include Web Real-Time Communication (WebRTC), etc.

The server computing system (110) further includes an enterprise application service (135). The enterprise application service (135) is software or application-specific hardware, which, when executing on the computer processor, is configured for a range of functionalities that support the user application (130). In one or more embodiments, the enterprise application service (135) may include features to securely store and manage user application data, and data synchronization. The enterprise application service (135) may further include business logic that supports the various features of the user application (130), such as analytics, reporting, transaction processing, etc. Examples of the enterprise application service (135) include diverse business software services supporting corresponding business software applications. For instance, Microsoft 365® supports Microsoft Office®, Salesforce Cloud® supports Salesforce CRM®, Intuit Enterprise Suite® supports QuickBooks®, etc.

The enterprise application service (135) further includes a service event manager (109). The service event manager (109) is computer program code configured to publish an event to an event queue (not shown) between the user application (130) and the enterprise application service (135). The service event manager (109) may further be configured to subscribe to events being published by the user application (130) in the event queue between the user application (130) and the enterprise application service (135). The service event manager (109) and the application event manager (132) of the user application (130) may be considered to be counterparts in a publisher-subscriber model. The publisher-subscriber model (pub-sub) is a messaging pattern used in software architecture to facilitate communication between different components. The entity that creates and sends messages (events) is the publisher, and the entity that receives messages (events) is the subscriber. The messages (events) may be published or subscribed to an event queue or bus. In the context of the user application (130) and the enterprise application service (135), an event may be considered to be an occurrence or change in the state of the user application (130), or in the enterprise application service (135). For example, a user interacting with the virtual assistant in a customer profile feature of the user application (130) may navigate to the inventory feature. This navigation may cause a change in context of the web interface (103). The change in context may be an event that the user application (130) publishes to the event queue via the application event manager (132). The service event manager (109) subscribing to the event queue may receive an alert of the occurrence of the event. The event may be further processed by the DOM orchestrator agent (108) to update the DOM/application context. Thus, in this case, the user application (130) is the publisher, and the enterprise application service (135) is the subscriber. Notably, the roles may be reversed, i.e., the enterprise application service (135) may publish a particular event and the user application (130) may be subscribed to the particular event.

The system shown in FIG. 1 further includes a user computing system (101). The user computing system (101) may be considered remote or local. A remote user computing system may be operated by a third-party that does not control or operate the system of FIG. 1. Similarly, the organization that controls the other elements of the system of FIG. 1 may not control or operate the remote user computing system. Thus, a remote user computing system may not be considered part of the system of FIG. 1. In contrast, a local user computing system is operated under the control of the organization that controls the other components of the system of FIG. 1. Thus, a local user computing system may be considered part of the system of FIG. 1.

As shown in FIG. 1, the user computing system (101) includes a user application (130). The user computing system (101) may include a display for displaying the web interface (103) of the user application (130). Further, the user computing system (101) may include one or more input devices for receiving input from the user. The user computing system (101) may further include a network interface for connecting the user computing system (101) to the server computing system (110). The user computing system (101) may be configured to execute the user application (130). In one or more embodiments, the user application (130) may be a web-based client application, operating within a web browser. Other embodiments of the user application (130) may include native desktop applications, mobile applications, remote desktop clients, etc. The user application (130) may be serviced by the enterprise application service (135), executing on the server computing system (110). The web interface (103) of the user application (130) is the interactive component of the user application (130). Users may interact with the web interface (103) of the user application (130) in a web browser. The web interface (103) may include the visual elements, controls, and functionalities needed for users to perform tasks and access features of the user application (130).

The user application (130) further includes a virtual assistant (102). The virtual assistant (102) is a software feature or service of the user application (130) that uses artificial intelligence (AI) to assist users with various tasks. The various tasks may range from answering questions about diverse features of the application, offering, and aiding in frequently performed tasks of the user application (130), such as form filling, proofreading, etc. Virtual assistants use natural language processing to understand and respond to user queries in natural language. Accordingly, the virtual assistant (102) may interact with the user via text chat, or speech. For example, the user may be browsing an invoice generation section of the user application (130), where the user application (130) is a financial and business accounting application. The virtual assistant (102) may "pop up" and engage the user in a conversation, for instance by texting or saying "Hi, I see that you are looking at invoice creation. I can create a custom invoice for you. Would you like me to continue?" Thus, user interaction with the user application (130) may include interaction via input devices with the web interface (103), and natural language interactions with the virtual assistant (102).

The user application (130) further includes a real-time communication protocol client (104). The real-time communication protocol client (104) is configured to operate a real-time synchronous bi-directional communication channel with the real-time communication protocol server (107) of the server computing system (110). In one or more embodiments, the user application (130) may use the real-time communication protocol client (104) to open and establish the synchronous bi-directional communication channel to the real-time communication protocol server (107). One example of a real-time communication protocol client is a WebSocket client.

The user application further includes one or more background worker thread(s) (105). The background worker threads (105) are background processing threads of the user application (130). In one or more embodiments, the background worker threads (105) may include at least an audio input processing thread. Further, upon gaining control of the web interface (103) from the user (for example, the user has "screenshare" mode enabled), video data may be captured via the web browser native screen-capture application programming interface (API). The captured video data may be processed by an additional background process as a screen-capture thread. Thus, the background worker threads (105) may include an audio input processing thread and a screen-capture thread.

The user application (130) may use diverse commercial audio/video processing APIs and associated computer program code libraries in implementing the background worker threads (105). One example of an audio input processing API is Audio Worklets. An example of a video processing API is the Media Capture and Streams API.

The user application (130) may further include an application event manager (132). The application event manager (132) is computer program code configured to publish an event to an event queue between the user application (130) and the DOM orchestrator agent (108). The application event manager (132) may further be configured to subscribe to events being published by the DOM orchestrator agent (108) in the event queue between the user application (130) and the DOM orchestrator agent (108). The service event manager (109) and the application event manager (132) of the user application (130) may be considered to be counterparts in a pub-sub model.

While FIG. 1 shows a configuration of components, other configurations may be used without departing from the scope of one or more embodiments. For example, various components may be combined to create a single component. As another example, the functionality performed by a single component may be performed by two or more components.

Figure 2:
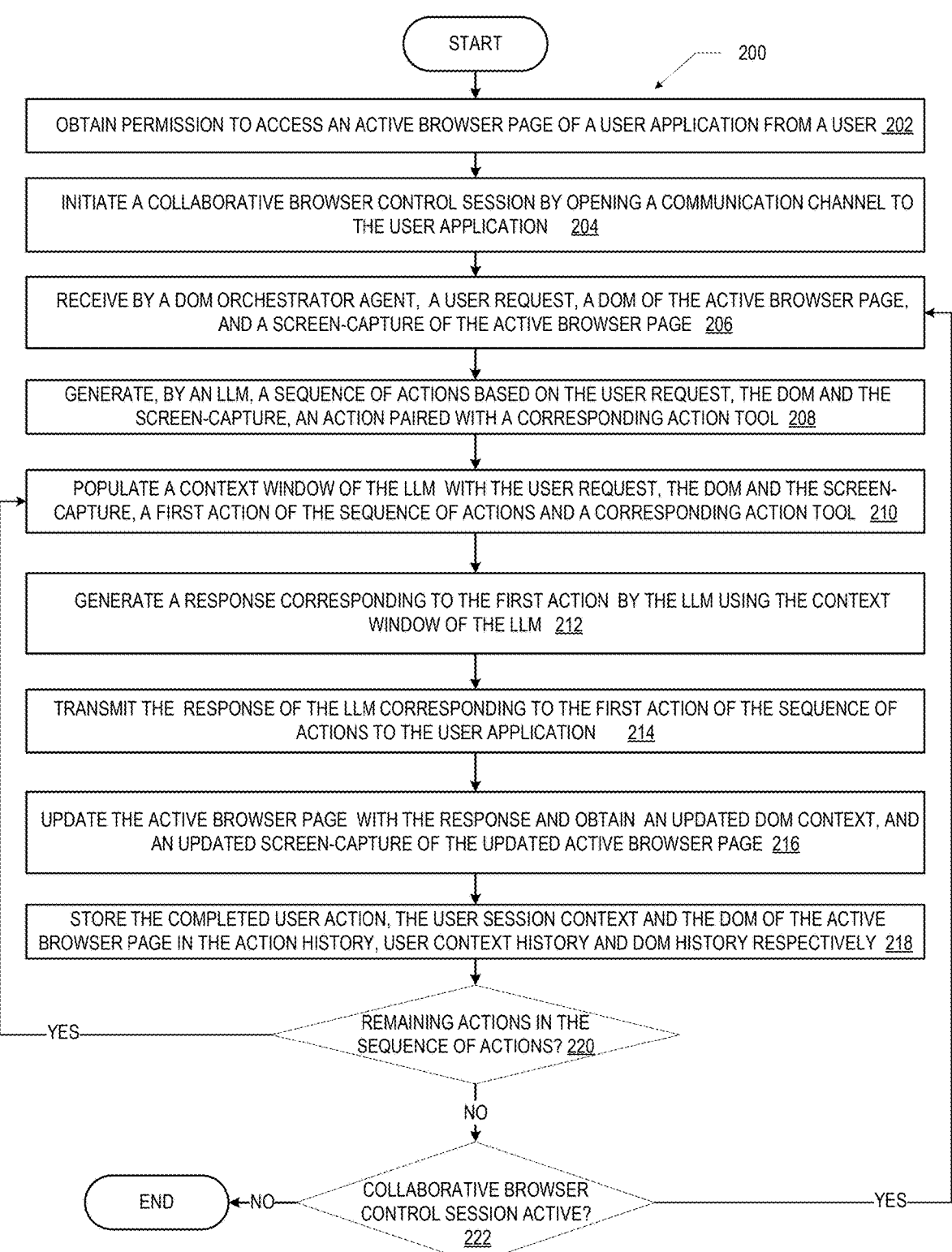
FIG. 2 shows a flowchart of a method, in accordance with one or more embodiments.

FIG. 2 shows a flowchart 200 of a method for controlling and updating a web interface of a user application through the DOM of the web interface, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined, or omitted, and at least some of the steps may be executed in parallel. Furthermore, the steps may be performed actively or passively.

In Block 202, permission to access an active browser page of a user application is obtained from a user. The user application may be executing within a web browser. In one or more embodiments, the user may grant permission for accessing and interacting with a browser page, referred to as the active browser page, of the user application. Permission may be granted via the browsers microphone permission and/or tab sharing functionality. Granting of the permission may be accomplished by a command, a button click, or other UI elements designed for web data interactions, etc. Thus, as a result, the system shown in FIG. 1 may gain access to the document object model of the active browser page directly. The installation and execution of an external application, browser application, or browser automation instance may thereby be obviated.

Subsequently, in Block 204, a collaborative session is initiated by opening a communication channel to the user application. In one or more embodiments, the communication channel may be a real-time, bi-directional, synchronous communication channel to the user application. In one or more embodiments, the collaborative session may be a real-time interactive session in which the DOM orchestrator agent and the user may jointly control the active browser page.

In one or more embodiments, the steps of Block 206-220 of the flowchart 200 may be iterated for the duration of the collaborative session.

In Block 206, a user request, a DOM of the active browser page, and a screen-capture of the active browser page, may be received by a DOM orchestrator agent. In one or more embodiments, the user request may ensue from a user interaction with the virtual assistant. For example, the user may make a request of the virtual assistant in natural language, by speech, text, or other method. In certain other embodiments, the user may manually use one or more UI elements designed for the web data interaction. For example, the user may click on a submit button of a form, or select an item from a drop-down menu, etc., causing the request to be transmitted over the session communication channel. The screen-capture of the active browser page may be obtained from a background worker thread triggered by the web browser when the collaborative session is initiated. Obtaining the screen-capture is described in further detail in reference to FIG. 3B.

In Block 208, a sequence of actions is generated by the LLM, based on the user request, the DOM, and the screen-capture of Block 206. An action of the sequence of actions is paired with a corresponding action tool. In one or more embodiments, an intent of the user request may be determined by the LLM, based on the user request, the DOM, and the screen-capture. Further, the sequence of actions generated by the LLM may be based on the intent of the user request determined by the LLM. The intent of a user request is a semantic aspect of the user request and refers to the underlying goal or purpose behind the user request. The intent represents what the user wants to achieve or the action the user intends to perform. In the collaborative session, the intent of the user request may be further informed by the DOM and the screen-capture of the active browser page. In one or more embodiments, the LLM may determine the semantic intent of the user request using inherent natural language and multi-modal capabilities to process the user request, the DOM, and the screen-capture. For example, a user request may be, "How do I add a new item?". The DOM and the screen-capture may indicate that the user is currently navigated to the "inventory" section/page of the user application. Thus, the open-ended user request may be informed by the DOM and the screen-capture to narrow down the intent of the user request. In this scenario, the intent may be determined as (learning how to) add items to the inventory.

The sequence of actions generated by the LLM, when implemented, or executed, may accomplish the intent of the user request. The sequence of actions may be in a machine-readable and processable format, such as a JSON document. An action may include a corresponding instruction. The instruction may be a structured instruction in the JSON document. The structured instruction may be paired with a corresponding action tool, obtainable from the agentic tool catalog. In certain other embodiments, the instruction may be a natural language instruction to perform a task using a corresponding action tool. In one or more embodiments, the actions of the sequence of actions may be performable by the DOM orchestrator agent by using and/or deploying one or more tools obtained from the agentic tool catalog. In one or more embodiments, the sequence of actions may include actions directly manipulating the DOM and actions that do not directly manipulate the DOM. Actions directly manipulating the DOM may correspond to the DOM action tools of the agentic tool catalog. The actions and corresponding DOM action tools may affect diverse changes to the active browser page view, for example, a button being clicked, a portion of the screen being highlighted, a form being populated, etc. Further, actions that do not directly manipulate the DOM may include actions that generate an output to be rendered on the active browser page, such as retrieving information from online sources, or from the enterprise document store.

In Block 210, a context window of the LLM is populated with the user request, the DOM, and the screen-capture, a first action of the sequence of actions and a corresponding action tool. In one or more embodiments, the corresponding action tool may be one of an action tool that does not directly manipulate the DOM, or a DOM action tool. In one or more embodiments, the DOM orchestrator agent may populate the context window of the LLM.

In Block 212, a response corresponding to the first action is generated by the LLM using the context window of the LLM. In one or more embodiments, the first action of the sequence of actions may be a DOM action. The corresponding action tool may be a particular DOM action tool. The response generated by the LLM may include the DOM action tool, now configured by the LLM, resulting in a configured corresponding action tool. Based on the DOM of the active browser page, the first action, and the screen-capture of the active browser page, the LLM may configure the DOM action tool parameters with one or more specific UI element selectors. UI element selectors are DOM element selectors for DOM elements which are shown in the active browser page. A DOM element selector may identify and select specific DOM elements within an HTML document, based on various attributes, for example, element id, element descriptor, element class, etc. In one or more embodiments, the LLM may determine at least one parameter of the DOM action tool to be populated with at least one corresponding parameter value, i.e., a DOM (UI) element selector(s). By way of example, the DOM action tool for highlighting a DOM element may have a parameter for element type, and a parameter for descriptor. The LLM may populate the element type as "button" and the descriptor as "Create Custom Invoice Template," in response to a user request "Highlight the create invoice button."

In one or more embodiments, in the case where the first action is not a DOM action, namely, the action does not entail direct manipulation of the DOM, the corresponding action tool may be executed to obtain a corresponding output. Further, the response may be generated by the LLM using the corresponding output. For example, if the user request is to obtain vendor details of a particular vendor, and a URL of the vendor is provided, the DOM orchestrator agent may select the online search tool from the agentic tool catalog and may execute the online search tool with the URL provided. The output of the search tool may be a set of search results. The LLM may further use the search results to generate a response. The response may in turn be displayed in the web browser or displayed or conveyed in the virtual assistant.

In Block 214, the response of the LLM corresponding to the first action of the sequence of actions is transmitted to the user application. In one or more embodiments, the response may be transmitted over the communication channel to the user application that was opened for the collaborative session.

In Block 216, the active browser page is updated with the response and an updated DOM, and an updated screen-capture of the updated active browser page is obtained. The response may be rendered by the web browser in the active browser page. In the case of the response being an output of an action tool that does not directly manipulate the document object model, rendering the response may entail displaying or conveying the response in one or more DOM elements of the active browser page, or via the virtual assistant. In the case where the response is a configured DOM tool that directly manipulates the DOM, the configured DOM tool may be executed by the web browser in the active browser page to perform the action on the appropriate DOM element(s). For example, the user request may be "highlight the custom invoice creation button for me,". The response generated by the LLM may be the DOM highlight tool, configured with the UI element selector corresponding to the descriptor "Create custom invoice template" as a parameter value. Thus, when the configured DOM highlight tool is executed by the web browser, the button "Create custom invoice template" may be highlighted.

In Block 218, the completed action, the user session context, and the DOM of the active browser page is stored in the action history, user context history, and DOM history, respectively. In one or more embodiments, storing may be performed prior to updating the active browser page.

Blocks 220 and 222 determine the continuation of the collaborative session and the execution loops of the sequence of actions. Within the execution loops, the DOM orchestrator agent manages user requests, and coordinates workflows of actions of the sequence of actions. Thus, the webpage is incrementally updated subsequent to each action. In the updates, selected elements of the webpage are updated via the communication channel. The bandwidth utilization of the internet backbone between the server computing system and the user computing system is optimized in this manner to reduce overall bandwidth demand.

In Block 220, a check to ascertain if there are more actions in the sequence of actions is carried out. That is, a check to ascertain whether the actions of the sequence of actions of Block 208 have been performed is carried out. If the sequence of actions has been performed, that is, no more actions remain to be performed in the sequence of actions, control passes to Block 222. On the other hand, if there are remaining actions to be performed in the sequence of actions, then control passes to Block 210, for a succeeding iteration of Blocks 210-218. In Block 222, a second check is performed to ascertain whether the collaborative session is active. If the collaborative session is active, control passes back to Block 206. If the collaborative session has ended, then the method of FIG. 2 terminates.

FIG. 3A shows a flowchart 300 of a method responding to a change in context of the active browser page by the user during an ongoing collaborative session. The method of FIG. 3A may be implemented using the system of FIG. 1 and one or more of the steps may be performed on or received at one or more computer processors. While the various steps in the flowchart 300 are presented and described sequentially, at least some of the steps may be executed in different orders, may be combined, or omitted, and at least some of the steps may be executed in parallel. Furthermore, the steps may be performed actively or passively.

As described in reference to FIG. 1, an additional mechanism of ascertaining the state of the active browser page during the collaborative session may be possible. The additional mechanism may be affected by monitoring an event queue of the pub-sub messaging model between the user application and the enterprise application service. The DOM agent orchestrator may work in conjunction with the enterprise application service to process events in the event queue that are subscribed to by the service event manager.

In Block 302, notification of an event occurrence is received. The event includes a route change of the user application to a second active browser page. In one or more embodiments, the service event manager of the enterprise application service may receive the notification of the event occurrence and may invoke the DOM orchestrator agent. The DOM orchestrator agent may then obtain the DOM of the active browser page. In one or more embodiments, the step of Block 302 may include receiving a notification of an event occurrence, the event including a route change of the user application. The route change may include a user-initiated navigation to a second active browser page of the user application.

In one or more embodiments, a route change event may occur when the user navigates away from a current feature, section, or page of the user application being shown on the active browser page, and moving to another feature, section, or page. Other route changes may be possible. By way of example, the user may have spent an initial interval of time in a current collaborative session working with the invoice feature of the user application, viewing various customer invoices, creating custom invoice templates, etc. The user may navigate away from the invoice feature to an inventory feature. Thus, the user navigates from a first active browser page to a second active browser page. This user-initiated navigation may result in a route change event being triggered and published by the application event manager in the event queue between the user application and the enterprise application service. The service event manager of the enterprise application service, having subscribed to the event queue, may receive the event.

In Block 304, the LLM context window is populated with the DOM of the second active browser page and a prompt corresponding to the route change. In one or more embodiments, the DOM of the second active browser page may be passed to the LLM, and an application context may be determined by the LLM using the DOM of the second active browser page. The application context may correspond to the route change. The application context may include the feature, section, or page of the user application being shown in the second active browser page. Further, based on the application context determined by the LLM, the DOM orchestrator agent may retrieve the prompt from the prompt registry, corresponding to the application context. Continuing with the previous example, the LLM may interpret the DOM of the second active browser page as an inventory feature, section, or page, and generate an application context as the inventory feature of the user application. Accordingly, the DOM orchestrator agent may obtain a prompt from the prompt registry corresponding to the inventory feature. An example of a prompt obtained from the prompt registry is shown in FIG. 5.

In Block 306, a response to the route change is generated by the LLM, using the prompt and the DOM.

In Block 308, the response is transmitted to the user application via the communication channel of the collaborative session.

In Block 310, the response is presented in the active browser page. In one or more embodiments, the response may be presented via the virtual assistant in the second active browser page. In one or more embodiments, the response may be displayed in a chat window of the virtual assistant. In other embodiments, the virtual assistant may convey the response to the user by spoken natural language utterances. In further embodiments, the response may be presented in the second active browser page using one or more DOM elements of the second active browser page.

FIG. 3B shows a flowchart 320 of a method to process audio/visual (A/V) data generated in the user application during an ongoing collaborative session. The method of FIG. 3B may be implemented using the system of FIG. 1 and one or more of the steps may be performed on or received at one or more computer processors. While the various steps in the flowchart 320 are presented and described sequentially, at least some of the steps may be executed in different orders, may be combined, or omitted, and at least some of the steps may be executed in parallel. Furthermore, the steps may be performed actively or passively.

In one or more embodiments, the user may interact with the user application during a collaborative session by speaking with the virtual assistant. As a result, capturing the user's intent and action may entail capturing and processing audio data generated during the collaborative session. Further, the collaborative session may be characterized by dynamic changes to the active browser page in real-time. In order to obtain a relevant, up-to-date, and accurate state of the dynamically changing active browser page, periodic screen-captures of the active browser page may be received by the DOM orchestrator agent. Obtaining the screen-captures may entail capturing and processing video data of the collaborative session. Processing of audio/visual (A/V) data may be a computing resource-intensive task. Therefore, the processing of A/V data may be performed by one or more background worker threads of the main web browser thread controlling the active browser page. The background worker threads may periodically update the main web browser thread with the results of processing the A/V data.

In Block 322, a first background worker thread to process audio data of the collaborative session is initiated by the web browser. Further, in Block 324, a second background worker thread to process video data of the collaborative session is initiated by the web browser. In one or more embodiments, the web browser may initiate the first and second background worker threads when the user application is opened in the user computing system. In other embodiments, the first and second background threads may be initiated by the browser when the collaborative session is initiated (for example, in Block 204 of FIG. 2).

In Block 326, raw audio data of the collaborative session is processed by the first background worker thread. Audio data chunks are sent to the web browser at periodic time intervals, for example, every 100 milliseconds. In one or more embodiments, processing raw audio data may entail obtaining raw audio data from the input source, such as a microphone of the user computing system. The raw audio data may be converted and packaged into an audio buffer as a chunk. When a particular audio buffer is filled with converted raw audio data, the audio buffer may be relayed to the main thread, i.e., the web browser thread. In one or more embodiments, the buffered data relayed to the web browser by the first background worker thread may be converted to text by the web browser via speech-to-text conversion APIs. Further, the text converted from the buffered audio data may be appended to the DOM. In other embodiments, the buffered audio data may be appended to the DOM as-is.

In Block 328, raw video data of the collaborative session is processed by the second background worker thread. Screen-captures of the video data are sent to the web browser at periodic time intervals. In one or more embodiments, processing raw video data may entail retrieving the MediaStream of the active browser page via the native screen-capture API of the web browser. In a similar manner to the DOM, the MediaStream of a web document is a programmable model that represents the A/V data of the web document. The MediaStream is programmatically accessible via MediaStream API calls, and computer programs and scripts may access and manipulate video data by using the MediaStream API calls. In one or more embodiments, the second background worker thread may use the MediaStream API to obtain buffered chunks of video data. The video data may be periodically relayed to the main web browser thread as screen-captures.

Figure 4A:
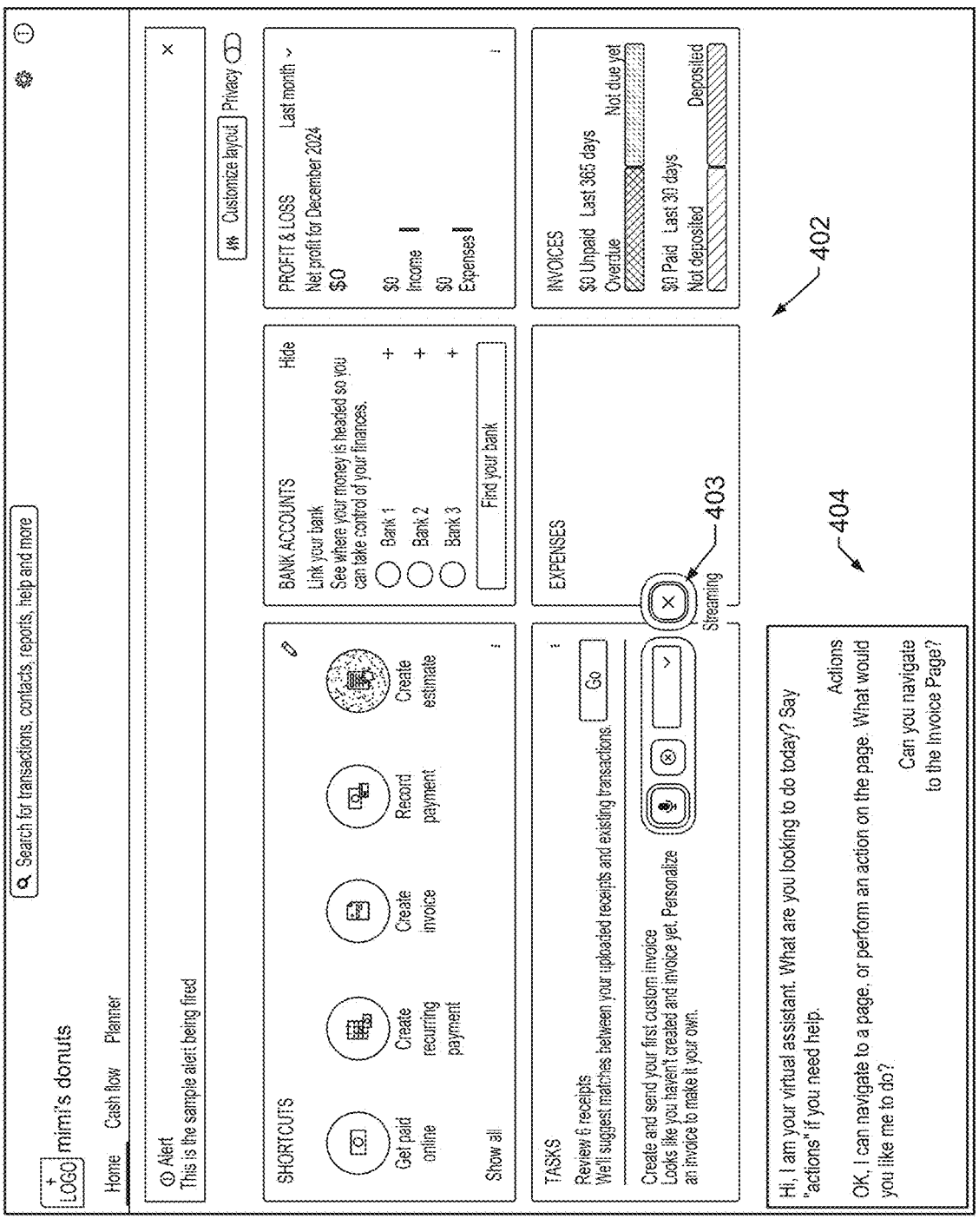
FIGS. 4A, 4B, and 4C show examples of screenshots of a collaborative session, in accordance with one or more embodiments.
Figure 4B:
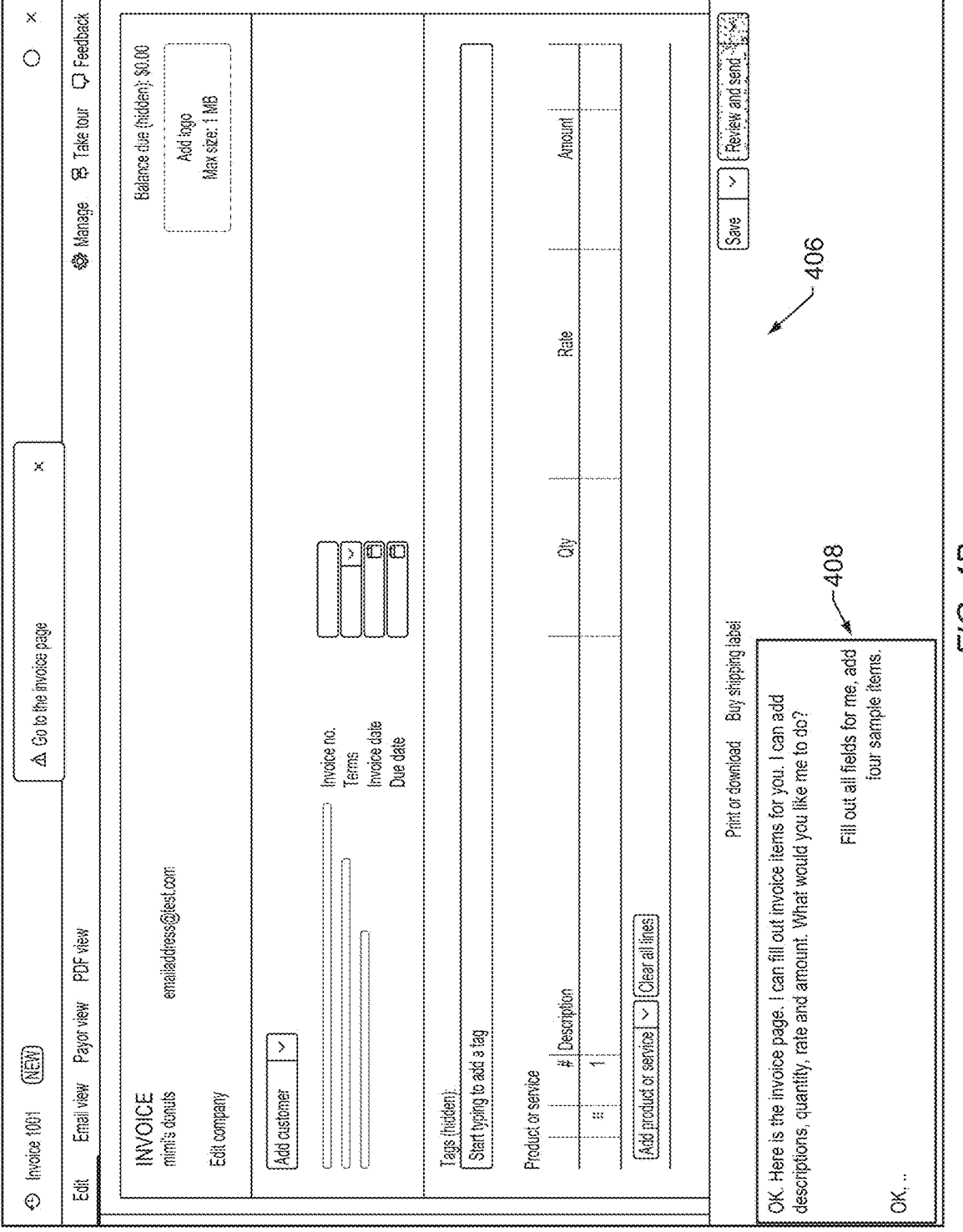
Figure 4C:
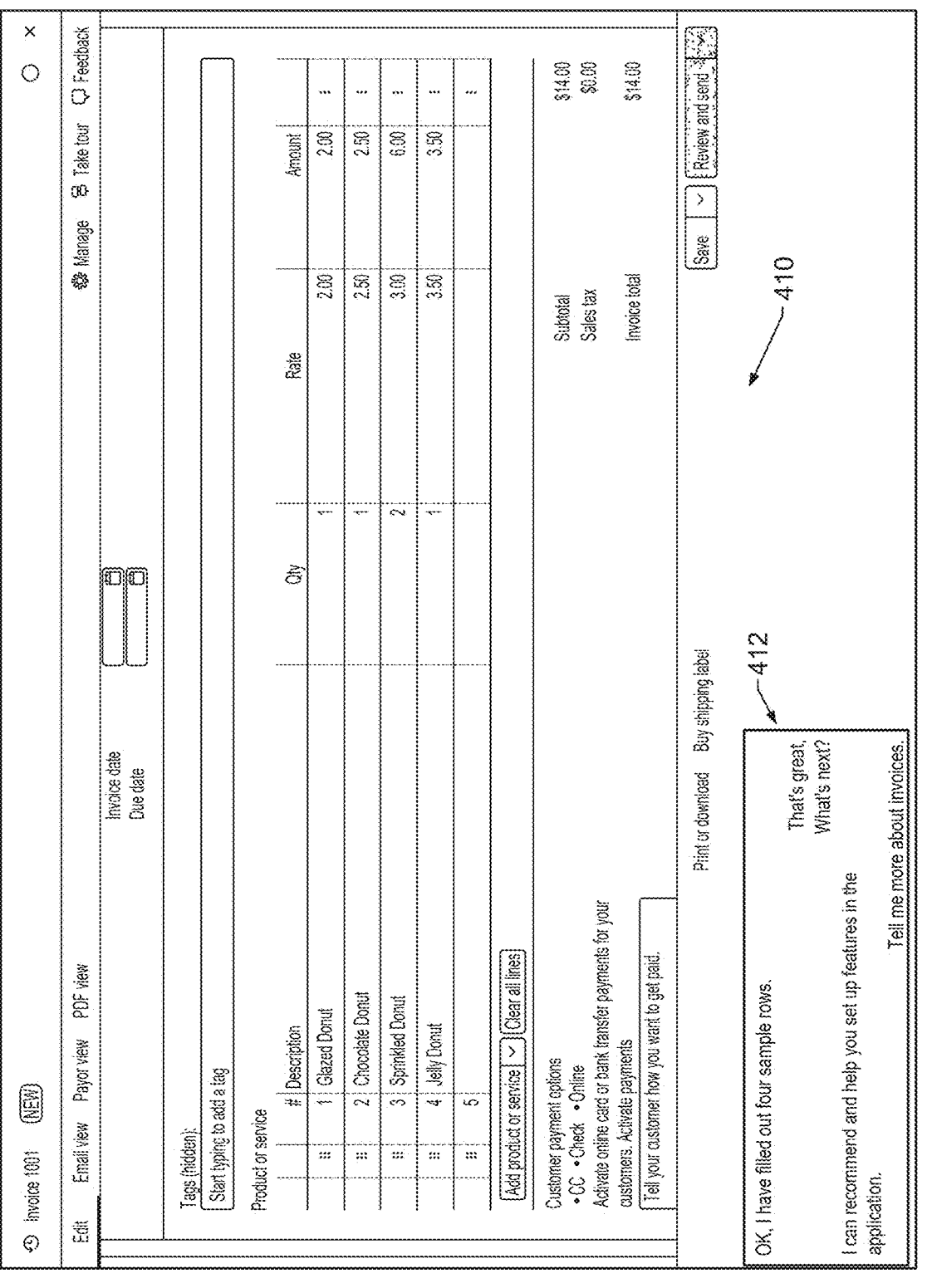

FIGS. 4A, 4B, and 4C show examples of screen-captures from a collaborative session, in accordance with one or more embodiments. The following examples are for explanatory purposes only and not intended to limit the scope of one or more embodiments. The screen-captures may be obtained from a collaborative session with a user application. The chat windows shown in FIGS. 4A, 4B, and 4C are representative of transcripts of a spoken session between a user and a virtual assistant of the user application.

In FIG. 4A, Block 402 is an example of a user application dashboard. The user application is a small business finance and accounting application. Button 403, titled "Streaming," is a push button that a user may use to activate the collaborative session. Block 404 is a transcript of a spoken interaction between the user and the virtual assistant of the user application. Upon clicking the "Streaming" button, the virtual assistant may begin the interaction by saying, or displaying on a chat screen "Hi, I am your virtual assistant . . . ," with an introduction to some features that the virtual assistant can help the user to use and customize. In the interaction of Block 404, the user requests a navigation to the invoice page. The virtual assistant affirms, and the user application transitions to the invoice page, as shown in FIG. 4B.

In FIG. 4B, Block 406 shows the invoice page of the user application. The virtual assistant continues the interaction, the transcript of which is shown in Block 408. The virtual assistant describes a task in detail which it can perform. The user assents and requests that four sample items be added to the invoice, and all fields be filled for the four sample items. The virtual assistant affirms, and the user application invoice page changes to show that the four sample items have been added. The changed invoice page is shown in FIG. 4C. Block 410 shows the invoice screen of FIG. 4B, with four sample invoice items added. In Block 412, the virtual assistant reports to the user that the four items have been added. The user answers with an open-ended question, "What's next?," and the virtual assistant provides further options for assisted workflows.

FIG. 5 shows an example of a pre-defined prompt, in accordance with one or more embodiments. The following example is for explanatory purposes only and not intended to limit the scope of one or more embodiments. Block 502 shows a pre-defined prompt, "INVOICE_PROMPT," for introducing the "Invoice" page/feature of the user application. The prompt includes a basic workflow of filling out an invoice with line items. The invoice prompt may be programmatically invoked with a "type" parameter of "Talk about invoicing." In this case, the invoice prompt may be used in a context of information dissemination. Accordingly, the LLM processes the prompt to generate a response as shown in Block 504. In another scenario, the invoice prompt may be programmatically invoked with a "type" parameter of "Fill in invoice." In this case, the invoice prompt may be used in a context of offering to assist, or act as a tutorial to the user on how to fill an invoice with various line items. Accordingly, the LLM processes the prompt with the parameter to generate a different response shown in Block 506. Notably, the response of Block 506 is different compared to Block 504. Thus, different responses may be generated from a prompt, depending on the context/parameters with which the prompt is programmatically invoked, or provided to the LLM.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 6A, 6B:
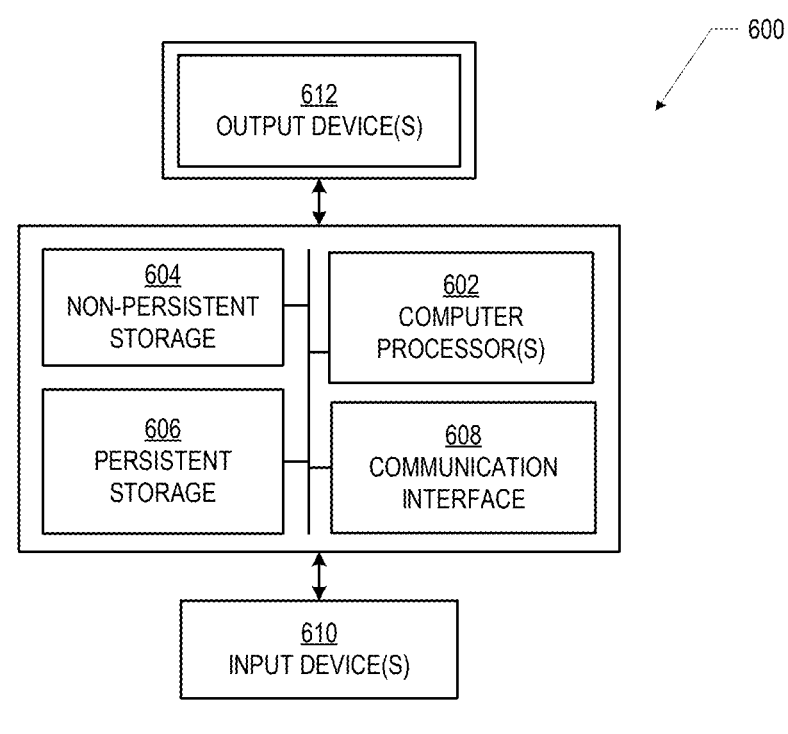
FIGS. 6A and 6B show a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s)

(602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN), such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

initiating a collaborative session with a user application; and performing, in the collaborative session, operations comprising:

retrieving a user request, a document object model (DOM) of an active browser page of the user application, and a screen-capture of the active browser page, obtaining, from a large language model (LLM), a sequence of actions, based on the user request, the DOM and the screen capture, and iteratively performing the sequence of actions comprising:

responsive to a first action of the sequence of actions being a DOM action, pairing the first action with a first corresponding action tool, the first corresponding action tool being a DOM action tool from an agentic tool catalog comprising a DOM input tool, a DOM selection tool, and a DOM highlight tool, responsive to a second action of the sequence of actions not being a DOM action, pairing the second action with a second corresponding action tool, wherein the second corresponding action tool does not directly manipulate the DOM, populating a context window of the LLM with the user request, the DOM, the screen-capture, the first action of the sequence of actions, and the first corresponding action tool, configuring, by the LLM, the first corresponding action tool using the context window to obtain a configured action tool, updating the active browser page using the configured action tool to obtain an updated active browser page, and obtaining an updated DOM corresponding to the updated active browser page as the DOM, and an updated screen-capture corresponding to the updated active browser page as the screen-capture.

2. The method of claim 1, further comprising:

obtaining permission to access the active browser page of the user application from a user;

initiating the collaborative session by opening a communication channel to the user application, wherein the communication channel is a real-time, bi-directional, synchronous communication channel; and generating, by the LLM, the sequence of actions, using the user request, the DOM, and the screen-capture.

3. The method of claim 1, further comprising:

updating the active browser page by transmitting the configured action tool over a communication channel to the user application, wherein the configured action tool is rendered in the active browser page; and storing the first action and the DOM of the active browser page, prior to transmitting the configured action tool.

4. The method of claim 1, wherein generating the sequence of actions further comprises:

determining, by the LLM, an intent of the user request based on the user request, the DOM, and the screen-capture; and generating the sequence of actions based on the intent of the user request, wherein an action of the sequence of actions comprises a corresponding instruction.

5. The method of claim 1, wherein iteratively performing the sequence of actions further comprises:

responsive to the action being the DOM action, and the corresponding action tool being the DOM action tool, configuring, by the LLM, the corresponding action tool using the context window to obtain the configured action tool by:

populating at least one parameter of the corresponding action tool with a corresponding parameter value, based on the first action, the user request, the DOM and the screen-capture.

6. The method of claim 1, wherein iteratively performing the sequence of actions further comprises:

responsive to the action not being a DOM action, executing the corresponding action tool to obtain a corresponding output, and generating a response by the LLM using the corresponding output; and updating the active browser page using the response to obtain the updated active browser page.

7. The method of claim 1, further comprising:

receiving a notification of an event, wherein the event comprises a route change of the user application, and wherein the route change comprises a user-initiated navigation to a second active browser page of the user application;

obtaining the DOM from the second active browser page of the user application;

determining an application context of the second active browser page, by the LLM, using the DOM;

obtaining a prompt from a prompt registry corresponding to the application context;

generating a response by the LLM, using the application context and the prompt; and transmitting the response to the user application.

8. The method of claim 7, further comprising:

transmitting the response to the user application via a communication channel of the collaborative session; and presenting the response in the second active browser page, wherein presenting the response comprises presenting the response via a virtual assistant in the second active browser page.

9. The method of claim 1, wherein initiating the collaborative session further comprises:

initiating, by a web browser executing the user application, a first background worker thread to process audio data of the collaborative session; and initiating, by the web browser, a second background worker thread to process video data of the collaborative session.

10. The method of claim 9, further comprising:

processing raw audio data of the collaborative session by the first background worker thread to obtain one or more audio data chunks;

sending the one or more audio data chunks to the web browser at periodic time intervals;

processing raw video data of the collaborative session by the second background worker thread to obtain one or more screen-captures; and sending the one or more screen-captures to the web browser at periodic time intervals.

11. A system, comprising:

at least one computer processor;

a DOM orchestrator agent, executing on the at least one computer processor;

a multi-modal large language model (LLM), executing on the at least one computer processor;

an enterprise application service, executing on the at least one computer processor;

a real-time communication protocol server, executing on the at least one computer processor; and configured for:

initiating a collaborative session with a user application; and performing, in the collaborative session, operations comprising:

receiving, by a service manager of the enterprise application service, a notification of an event occurrence, invoking, responsive to the event occurrence, the DOM orchestrator agent, retrieving, by the DOM orchestrator agent upon invocation, a user request, a document object model (DOM) of an active browser page of the user application, and a screen-capture of the active browser page, obtaining, from the LLM, a sequence of actions, based on the user request, the DOM, and the screen capture, and iteratively performing the sequence of actions comprising:

responsive to a first action of the sequence of actions being a DOM action, pairing the first action with a first corresponding action tool, the first corresponding action tool being a DOM action tool from an agentic tool catalog comprising a DOM input tool, a DOM selection tool and a DOM highlight tool, responsive to a second action of the sequence of actions not being a DOM action, pairing the second action with a second corresponding action tool, wherein the second corresponding action tool does not directly manipulate the DOM, populating a context window of the LLM with the user request, the DOM, the screen-capture, the first action of the sequence of actions, and the first corresponding-action tool, invoking the LLM to configure the first corresponding action tool using the context window to obtain a configured action tool, updating the active browser page using the configured action tool to obtain an updated active browser page, and obtaining, by the DOM orchestrator agent, an updated DOM corresponding to the updated active browser page as the DOM, and an updated screen-capture corresponding to the updated active browser page as the screen-capture.

12. The system of claim 11, further configured for:

obtaining permission to access the active browser page of the user application from a user;

initiating, by the DOM orchestrator agent the collaborative session by opening a communication channel via the real-time communication protocol server to the user application, wherein the communication channel is a real-time, bi-directional, synchronous communication channel; and generating, by the LLM, the sequence of actions, using the user request, the DOM, and the screen-capture.

13. The system of claim 11, further configured for:

updating the active browser page by transmitting the configured action tool over a communication channel to the user application, wherein the configured action tool is rendered in the active browser page; and storing the action and the DOM of the active browser page prior to transmitting the configured action tool.

14. The system of claim 11, wherein generating the sequence of actions further comprises:

determining, by the LLM, an intent of the user request based on the user request, the DOM, and the screen-capture; and generating the sequence of actions based on the intent of the user request, wherein the action of the sequence of actions comprises a corresponding instruction.

15. The system of claim 11, wherein iteratively performing the sequence of actions further comprises:

responsive to the action being the DOM action, and the corresponding action tool being the DOM action tool, configuring, by the LLM, the corresponding action tool using the context window to obtain the configured action tool by:

populating at least one parameter of the corresponding action tool with a corresponding parameter value, based on the first action and the user request, the DOM and the screen-capture.

16. The system of claim 11, wherein iteratively performing the sequence of actions further comprises:

responsive to the action not being a DOM action, executing the corresponding action tool to obtain a corresponding output, and generating the response by the LLM using the corresponding output; and updating the active browser page using the response to obtain the updated active browser page.

17. The system of claim 11, further configured for:

receiving, by a service event manager of the enterprise application service, a notification of an event, wherein the event comprises a route change of the user application, and wherein the route change comprises a user-initiated navigation to a second active browser page of the user application;

obtaining, by the DOM orchestrator agent, the DOM from the second active browser page of the user application via a communication channel;

determining, by the LLM, an application context of the second active browser page, using the DOM;

obtaining a prompt from a prompt registry corresponding to the application context;

generating a response by the LLM, using the application context and the prompt; and transmitting the response to the user application.

18. The system of claim 17, further configured for:

transmitting the response to the user application via a communication channel of the collaborative session; and presenting the response in the second active browser page, wherein presenting the response comprises presenting the response via a virtual assistant in the second active browser page.

19. The system of claim 11, wherein initiating the collaborative session further comprises:

initiating, by a web browser executing the user application, a first background worker thread to process audio data of the collaborative session; and initiating, by the web browser, a second background worker thread to process video data of the collaborative session;

processing raw audio data of the collaborative session by the first background worker thread to obtain one or more audio data chunks;

sending the one or more audio data chunks to the web browser at periodic time intervals;

processing raw video data of the collaborative session by the second background worker thread to obtain one or more screen-captures; and sending the one or more screen-captures to the web browser at periodic time intervals.

20. A method comprising:

obtaining, by a DOM orchestrator agent, permission to access an active browser page of a user application executing in a web browser;

initiating a collaborative session by opening, by the web browser, a communication channel to the DOM orchestrator agent, wherein the communication channel is a real-time, bi-directional, synchronous communication channel; and performing, in the collaborative session, and for a duration of the collaborative session, operations comprising:

retrieving, by the DOM orchestrator agent, a user request, a document object model (DOM) of an active browser page of the user application, and a screen-capture of the active browser page, generating, by an LLM, a sequence of actions, using the user request, the DOM, and the screen-capture, and iteratively performing the sequence of actions comprising:

responsive to a first action of the sequence of actions being a DOM action, pairing the first action with a first action tool comprising a DOM action tool from an agentic tool catalog, responsive to a second action of the sequence of actions not being a DOM action, pairing the second action with a second action tool, wherein the second action tool does not directly manipulate the DOM, populating, by the DOM orchestrator agent, a context window of the LLM with the user request, the DOM, the screen-capture, the first action of the sequence of actions, and a corresponding action tool, configuring, by the LLM, the first action tool using the context window to obtain a configured action tool, updating, by the web browser, the active browser page using the configured action tool to obtain an updated active browser page, and obtaining, by the DOM orchestrator agent, an updated DOM corresponding to the updated active browser page as the DOM, and an updated screen-capture corresponding to the updated active browser page as the screen-capture.

* * * * *